United States Patent
Takemura (10) Patent No.: US 7,686,340 B2
(45) Date of Patent: Mar. 30, 2010

(54) OCCUPANT RESTRAINT SYSTEM AND METHOD FOR RESTRAINING OCCUPANT IN SEAT OF VEHICLE

(75) Inventor: Naotoshi Takemura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 11/491,848

(22) Filed: Jul. 24, 2006

(65) Prior Publication Data

US 2007/0017726 A1    Jan. 25, 2007

(30) Foreign Application Priority Data

Jul. 25, 2005    (JP) .............................. 2005-214816

(51) Int. Cl.
B60R 22/046 (2006.01)
(52) U.S. Cl. ...................... 280/806; 180/268
(58) Field of Classification Search ................ 180/268, 180/282; 280/735, 806
See application file for complete search history.

(56) References Cited

U.S. PATENT DOCUMENTS 5,492,368 A * 2/1996 Pywell et al. ............... 280/806
6,186,538 B1 * 2/2001 Hamada et al. ............. 280/735
6,263,261 B1 * 7/2001 Brown et al. .................. 701/1
6,702,326 B1 * 3/2004 Fujii ........................... 280/806
2003/0188908 A1 * 10/2003 Abe ............................. 180/282
2004/0108706 A1 * 6/2004 Enomoto ..................... 280/807

FOREIGN PATENT DOCUMENTS

| JP | H06-286581 | 10/1994 |
| JP | 2001-114069 | 4/2001 |
| JP | 2004-148969 | 5/2004 |

* cited by examiner

Primary Examiner—Paul N. Dickson
Assistant Examiner—Timothy Wilhelm
(74) Attorney, Agent, or Firm—Ditthavong Mori & Steiner, P.C.

(57) ABSTRACT

An occupant restraint system includes a rollover prediction unit, a rollover detection unit, primary and secondary pre-tensioner units, and a control unit. The rollover prediction unit is configured to predict a rollover of the vehicle based on a state of the vehicle. The rollover detection unit is configured to detect a rollover of the vehicle based on the state of the vehicle. The primary and secondary pre-tensioner units are configured to apply a tension to a seat belt so as to restrain an occupant in a seat. An operation force of the secondary pre-tensioner unit is stronger than that of the primary pre-tensioner unit. The control unit is configured to activate the primary pre-tensioner unit based on a prediction by the rollover prediction unit that a rollover occurs and activate the secondary pre-tensioner unit based on a detection by the rollover detection unit that the rollover occurs.

23 Claims, 7 Drawing Sheets

OCCUPANT RESTRAINT SYSTEM AND METHOD FOR RESTRAINING OCCUPANT IN SEAT OF VEHICLE

CROSS-REFERENCE TO RELATED APPLICATIONS

The present application claims priority under 35 U.S.C. §119 to Japanese Patent Application No. 2005-214816, filed Jul. 25, 2005, entitled "Occupant Restraint Apparatus." The contents of this application are incorporated herein by reference in their entirety.

BACKGROUND OF THE INVENTION

1. Field of the Invention

The present invention relates to an occupant restraint system and a method for restraining an occupant in a seat of a vehicle.

2. Discussion of the Background

In the related art, there is a regulation which requires the provision on a vehicle such as a motor vehicle of an occupant restraint system such as a seat belt which prevents a forward movement of an occupant seated in a seat of the vehicle by virtue of inertial force when the vehicle is involved in a head-on collision. In general, while the safety of the occupant at the time of head-on collision is increased due to the occupant restraint system applying tension to the seat belt at all times, since the occupant is restrained in the seat at all times by the seat belt, the degree of comfortableness felt by the occupant gets deteriorated. To cope with this, there has been known an occupant restraint system including a head-on collision prediction unit for predicting a head-on collision of the vehicle and detecting a head-on collision of the vehicle (for example, refer to Japanese Patent Unexamined Publication No. Hei. 6-286581). The contents of this publication are incorporated herein by reference in their entirety.

Figure 7:
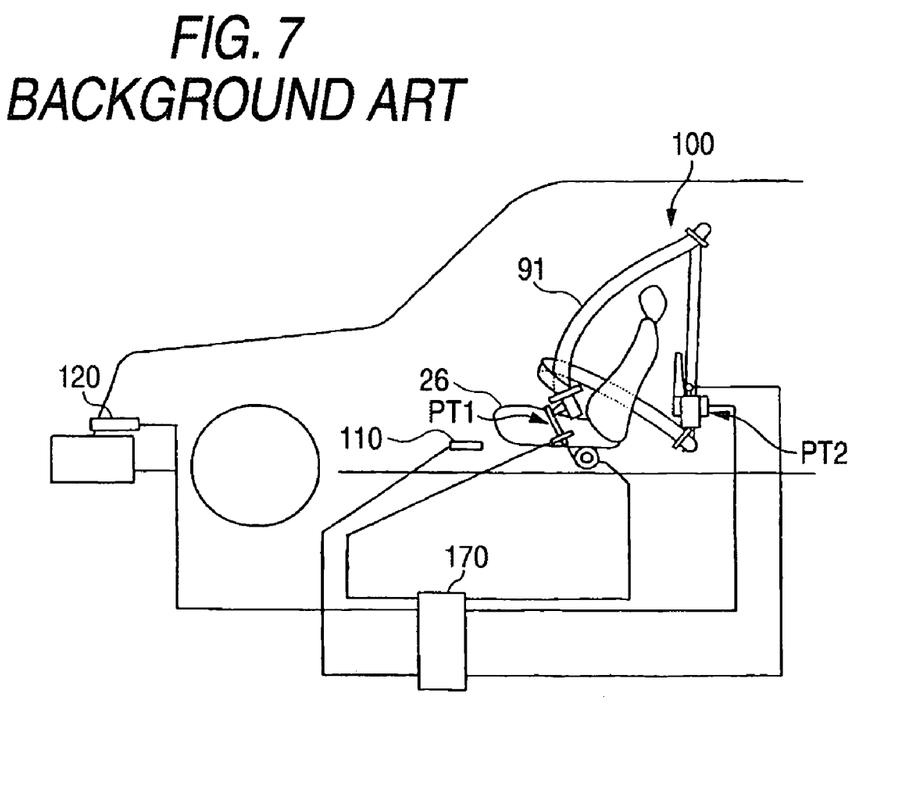
FIG. 7 is an exemplary diagram showing a related-art occupant restraint system.

As shown in FIG. 7, such an occupant restraint system 100 includes a seat belt 91 which can be worn by an occupant P seated in a seat 26 of a vehicle, a reversible pre-tensioner unit PT1 and a non-reversible pre-tensioner unit PT2 which are both adapted to apply a tension to the seat belt 91, an inter-vehicle distance sensor 120 and an acceleration sensor 110 which are both adapted to detect states of the vehicle, and a control unit 170 for predicting and detecting a head-on collision of the vehicle based on signals outputted from those sensors 120, 110 and activating the reversible pre-tensioner unit based on the prediction of a head-on collision-while activating the non-reversible pre-tensioner unit based on the detection of a head-on collision.

Figure 8:
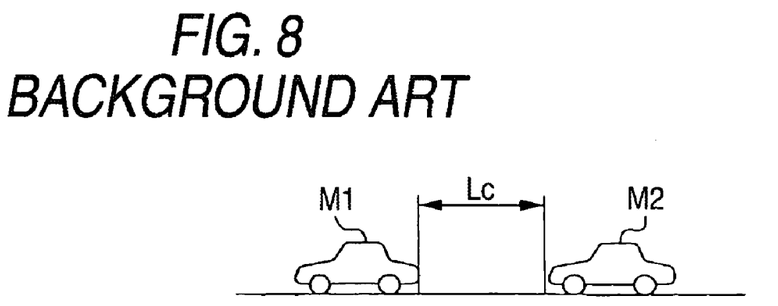
FIG. 8 is an explanatory diagram which explains the operation of an inter-vehicle distance sensor of the related-art occupant restraint system.

As shown in FIG. 8, prediction and detection of a head-on collision of a vehicle M2 on to a vehicle M1 are carried out based on an inter-vehicle distance Lc detected by the inter-vehicle distance sensor 120 and the acceleration of the vehicle M2. In the occupant restraint system 100 configured as such, when a head-on collision is predicted and detected, the occupant is restrained in the seat for preparation for a head-on collision, and the restraint of the occupant in the seat is not carried out on other occasions. Due to this, since the tension of the seat belt has already been increased so as to restrain the occupant in the seat when the vehicle is about to be involved in a head-on collision, the safety of the occupant is increased, and when there is no risk of the vehicle being involved in a head-on collision, the tension on the seat is mitigated so as to reduce the restraining force with which the occupant is restrained in the seat to thereby enhance the degree of comfortableness felt by the occupant.

However, the related-art occupant restraint system 100 includes the sensor which predicts and detects a head-on collision of the vehicle but does not include a sensor which direct predicts and detects a rollover of the vehicle. Due to this, the occupant restraint system 100 activates the non-reversible pre-tensioner unit in order to restrain the occupant in the seat in an early state of a rollover. Even in the event that the occupant restraint system 100 activates the non-reversible pre-tensioner unit, however, there may result a case where the vehicle does not roll over eventually. This causes a problem that the occupant has to be restrained in the seat to thereby be made to feel uncomfortable every time the false rollover warning is raised.

SUMMARY OF THE INVENTION

According to one aspect of the present invention, an occupant restraint system includes a seat belt, a rollover prediction unit, a rollover detection unit, primary and secondary pre-tensioner units, and a control unit. The seat belt is configured to restrain an occupant in a seat of a vehicle. The rollover prediction unit is configured to predict a rollover of the vehicle based on a state of the vehicle. The rollover detection unit is configured to detect a rollover of the vehicle based on the state of the vehicle. The primary and secondary pre-tensioner units are configured to apply a tension to the seat belt so as to restrain the occupant in the seat. An operation force of the secondary pre-tensioner unit is stronger than an operation force of the primary pre-tensioner unit. The control unit is configured to activate the primary pre-tensioner unit based on a prediction by the rollover prediction unit that a rollover occurs and activate the secondary pre-tensioner unit based on a detection by the rollover detection unit that the rollover occurs.

According to another aspect of the present invention, a method for restraining an occupant in a seat of a vehicle includes predicting a rollover of the vehicle based on a state of the vehicle, detecting a rollover of the vehicle based on the state of the vehicle, activating a primary pre-tensioner for applying a tension to a seat belt so as to restrain the occupant in the seat when a rollover is predicted, and activating a secondary pre-tensioner for applying a tension to the seat belt so as to restrain the occupant in the seat when a rollover is detected. An operation force of the secondary pre-tensioner is stronger than an operation force of the primary pre-tensioner

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
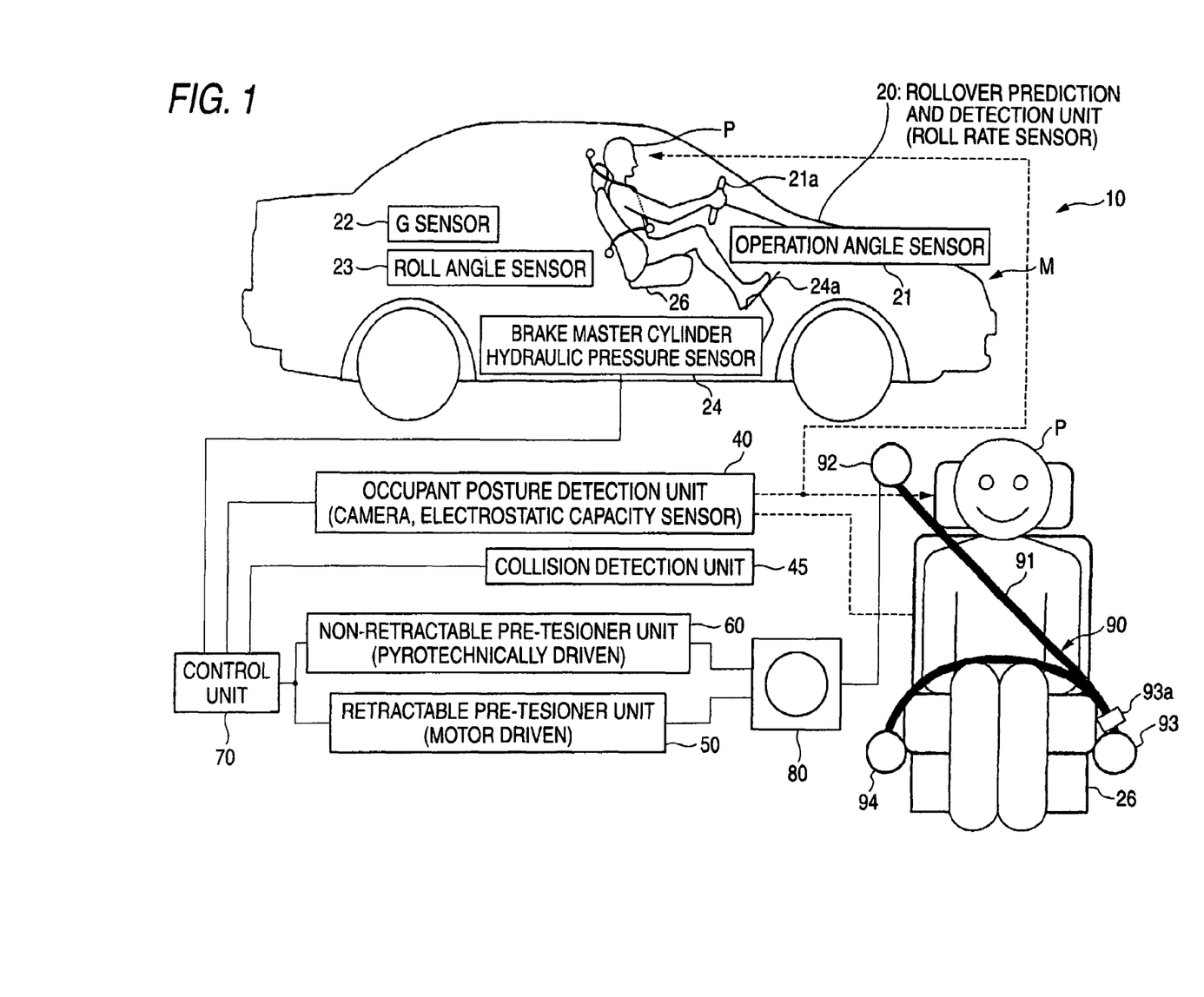
FIG. 1 is an exemplary diagram of an occupant restraint system according to an embodiment of the present invention.
Figure 2:
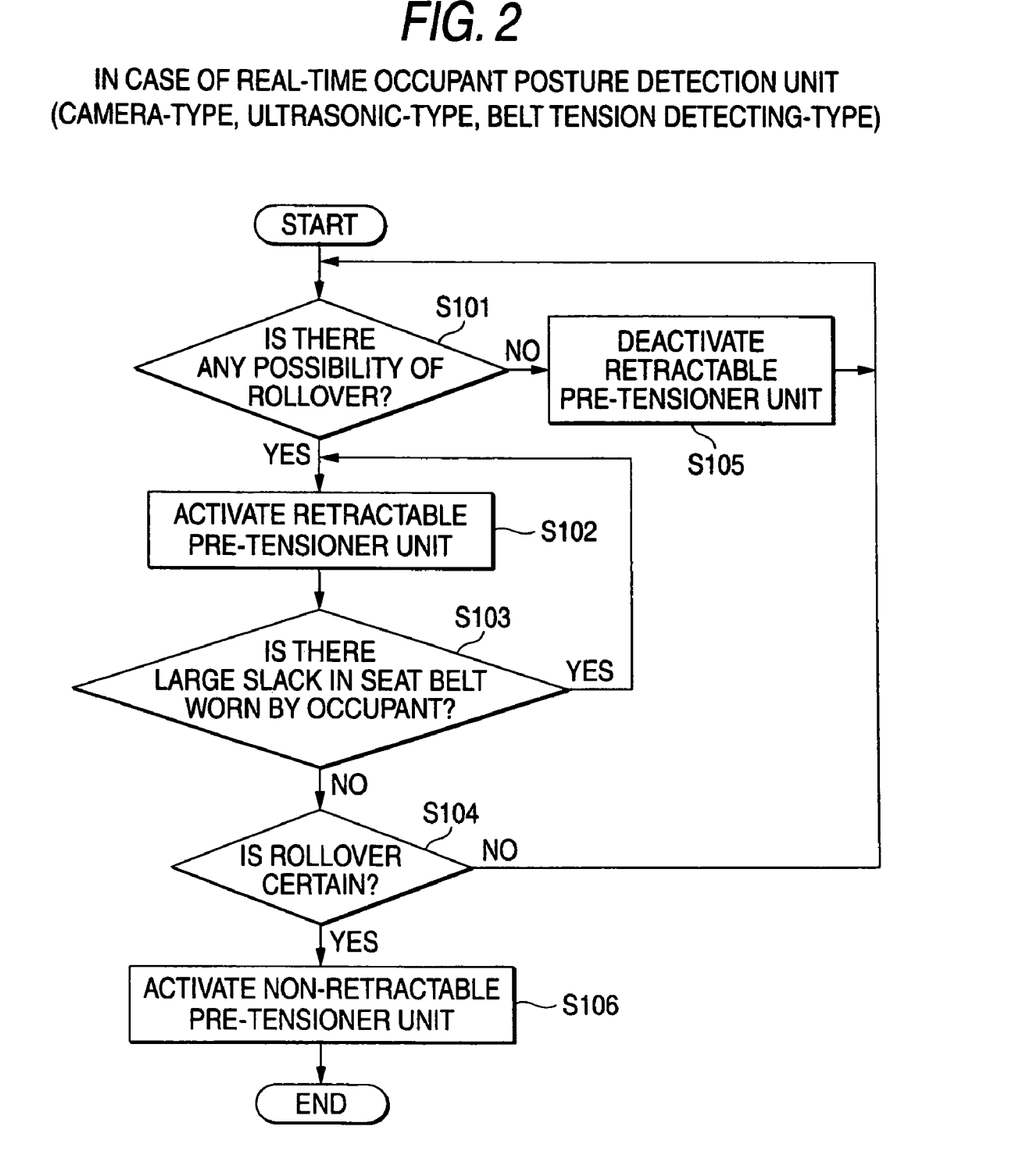
FIG. 2 is a flowchart showing a control method of the occupant restraint system shown in FIG. 1.

FIG. 1 is an exemplary view showing an occupant restraint system according to an embodiment of the present invention. FIG. 2 is a flowchart showing a control method of the occupant restraint system 10 shown in FIG. 1. FIGS. 3(A) and (B) are graphs showing a threshold value for a rollover prediction or detection in a rollover prediction and detection unit of the occupant restraint system shown in FIG. 1.

As shown in FIG. 1, the occupant restraint system 10 includes a rollover prediction and detection unit 20 for detecting a state of a vehicle M and predicting whether or not the vehicle M rolls over, a seat belt unit 90 having a seat belt 91 which can restrain an occupant P seated in a seat 26 of the vehicle M in the seat 26, a reversible pre-tensioner unit 50 and a non-reversible pre-tensioner 60 which are both adapted to apply a tension to the seat belt 91 so as to restrain the occupant P and a control unit 70 for activating the reversible pre-tensioner unit 50 and the non-reversible pre-tensioner unit 60 based on the state of the vehicle M detected and the prediction on whether or not the vehicle rolls over predicted by the rollover prediction and detection unit 20.

The rollover prediction and detection unit 20 includes a steering angle sensor 21 for detecting an operation angle of a steering wheel 21a through which the steering wheel is operated by the occupant P, a G sensor 22 for detecting an acceleration of the vehicle M, a roll angle sensor 23 for detecting a roll angle of the vehicle M, and a brake master cylinder hydraulic pressure sensor 24 for detecting a hydraulic pressure of a master cylinder which changes according to an operation amount of a brake pedal 24a which is operated by the occupant P. The rollover prediction and detection unit 20 functions as a roll rate sensor. The rollover prediction and detection unit 20 performs prediction and detection of a rollover of the vehicle M based on an operation angle, acceleration, roll angle and braking force which are detected by the sensors 21, 22, 23, 24, respectively, and when predicting the possibility of a rollover of the vehicle M, the rollover prediction and detection unit 20 outputs a rollover prediction signal, while when detecting the rollover of the vehicle M, the rollover prediction and detection unit 20 outputs a rollover detection signal, and on any other occasions, the rollover prediction and detection unit 20 outputs a normal signal which indicates that the vehicle M is driven normally.

The seat belt unit 90 has a belt-shaped seat belt 91, an outboard anchorage 94 to which one end of the seat belt 91 is fastened in such a manner as not to move relative to the seat 26 and hence to the vehicle, a retractor 80 for winding the other end of the seat belt 91, a shoulder anchorage 92 mounted in a position in the vicinity of the shoulder of the occupant P in such a manner as not to move relative to the vehicle, a buckle 93 mounted in a position in the vicinity of the waist of the occupant P in such a manner as not to move relative to the vehicle and a tongue 93a provided slidably on the seat belt 91 between the shoulder anchorage 92 and the outboard anchorage 94.

When being attached to the buckle 93 by the occupant, the tongue 93a is connected to the buckle 93 solidly, whereby the seat belt 91 which extends from the retractor 80 extends from the vicinity of the shoulder of the occupant P via the shoulder anchorage 92, passes the front of the chest of the occupant P and reaches the tongue 93a, while, additionally, the seat belt 91 which extends from the outboard anchorage 94 passes the front of the waist of the occupant P and reaches the tongue 93a, whereby the seat belt 91 can restrain the occupant P seated in the seat 26 in such a manner as to keep the occupant seated in the seat 26.

The retractor 80 winds and unwinds the one end of the seat belt 91 in association with the rotation of output shafts of the reversible pre-tensioner unit 50 and the non-reversible pre-tensioner unit 60.

The reversible pre-tensioner unit 50 includes a driving device such as a motor, which can rotate the output shaft of the reversible pre-tensioner unit 50 forwards and backwards. In addition, the reversible pre-tensioner unit 50 can change the rotational force of the output shaft of the reversible pre-tensioner unit 50 in response to a control signal from the control unit 70.

The non-reversible pre-tensioner unit 60 includes, for example, a explosive drive, which can rotate the output shaft of the non-reversible pre-tensioner 60 forwards. In addition, since the non-reversible pre-tensioner unit 60 includes the explosive drive, the output shaft of the non-reversible pre-tensioner unit 60 can be rotated forwards strongly.

The occupant restraint system 10 includes further an occupant posture detection unit 40. The occupant posture detection unit 40 can include, for example, a camera for photographing the posture of the occupant P and a known image recognition system for determining on the posture of the occupant P from the image photographed by the camera, or an electrostatic capacity sensor incorporated in the position of a backrest of the seat 26 and a determination system for determining on the posture of the occupant P based on an electrostatic capacity detected by the electrostatic capacity sensor. In addition, the occupant restraint system 10 includes a collision detection unit 45 for detecting a collision of the vehicle M to output a collision signal. A side impact sensor, a frontal collision sensor or an acceleration sensor incorporated within an SRS unit is used as the collision detection sensor 45.

The control unit 70 controls the reversible pre-tensioner unit 50 and the non-reversible pre-tensioner unit 60 based on a rollover prediction signal and a rollover detection signal from the rollover prediction and detection unit 20 and an occupant posture signal from the occupant posture detection unit 40. In addition, the control unit 70 controls the non-reversible pre-tensioner unit 60 based on a collision signal from the collision detection unit 45.

An occupant posture detection unit 40, which constitutes a target of a flowchart shown in FIG. 2, includes a detection unit for detecting the posture of the occupant P by a camera or ultrasonic wave or a tension detection unit for detecting a tension applied to the seat belt 91. Consequently, in the event that the occupant posture detection unit 40, which constitutes the target of the flowchart shown in FIG. 2, takes longer time to detect the posture of the occupant P than an electrostatic capacity type occupant posture detection unit which constitutes a target of a flowchart shown in FIG. 3, there may occur a case where the occupant P cannot be restrained in the seat 26 properly before the vehicle M rolls over even when attempting to detect the posture of the occupant P after the rollover of the vehicle M has been predicted. Then, the occupant posture detection unit 40 which constitutes the target of the flowchart shown in FIG. 2 detects the posture of the occupant M at all times.

The rollover prediction and detection unit 20 continues to predict and detect a rollover of the vehicle M without any interruption as long as the vehicle M is driven. In addition, the control unit 70 activates neither of the reversible pre-tensioner unit 50 and the non-reversible pre-tensioner unit 60.

<When the Vehicle is Running Normally>

The rollover prediction and detection unit 20 predicts and detects a rollover of the vehicle M based on an operation angle, acceleration, roll angle and braking force detected by the sensors 21, 22, 23, 24, respectively.

Figure 3:
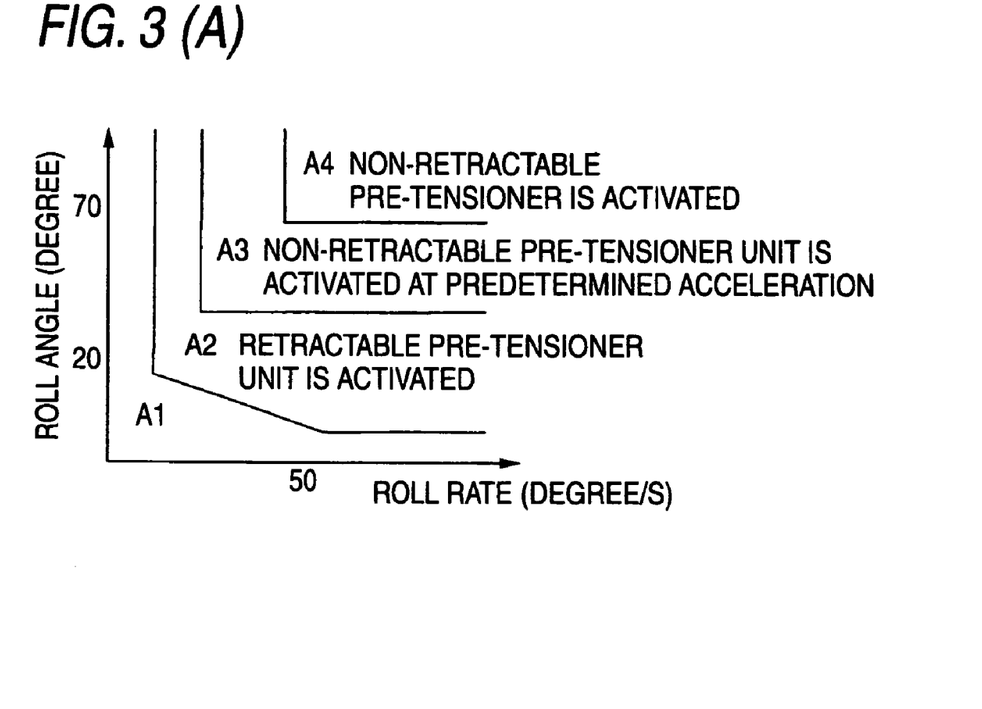
FIG. 3(A) is a graph showing threshold values for rollover prediction and detection in a rollover prediction and detection unit of the occupant restraint system shown in FIG. 1 and shows a relationship between roll angle and roll angular velocity and prediction and detection of a rollover.
FIG. 3(B) is a graph showing threshold values for rollover prediction and detection in a rollover prediction and detection unit of the occupant restraint system shown in FIG. 1 and shows a relationship between the acceleration of a vehicle and detection of a rollover.

The rollover prediction and detection unit 20 predicts and detects a rollover of the vehicle M based on, for example, threshold values shown in FIG. 3. To be specific, when the vehicle M is within the range of an area Al, the rollover prediction and detection unit 20 determines that the vehicle M is being driven stably (namely, properly). As this occurs, the rollover prediction and detection unit 20 outputs a normal signal while the vehicle M is being driven normally. When the vehicle is within the range of an area A2 or an area A3, the rollover prediction and detection unit 20 determines that the vehicle M is being driven unstably. As this occurs, the rollover prediction and detection unit 20 outputs a rollover prediction signal while the vehicle M continues to maintain the state of the area A2 or area A3. When the vehicle M is within the range of an area A4, the rollover prediction and detection unit 20 determines that the vehicle M is being driven to end up with a rollover. As this occurs, the rollover prediction and detection unit 20 outputs a rollover detection signal.

As shown in FIG. 2, the control unit 70 executes step S101 and step 105 repeatedly. To be specific, the control unit 70 determines whether or not there is a possibility of rollover based on signals from the rollover prediction and detection unit 20 (step S101). Since the control unit 70 determines that there exists no possibility that the vehicle M rolls over, step S105 is executed.

When the reversible pre-tensioner unit 50 is in operation, the control unit 70 stops the operation of the reversible pre-tensioner unit 50 step S105) Since the vehicle M is being driven properly and the reversible pre-tensioner unit 50 is not in operation, the control unit 70 maintains the state where the reversible pre-tensioner unit 50 remains deactivated.

When the vehicle M is being driven normally, the control unit 70 causes the state where the reversible pre-tensioner unit 50 remains deactivated to be maintained in this way.

<When the Vehicle is Predicted to be Likely to Roll Over from the Normal State>

When predicting a rollover of the vehicle M based on an operation angle, acceleration, roll angle and braking force detected from the sensors 21, 22, 23, 24, respectively, the rollover prediction and detection unit 20 outputs a rollover prediction signal to the control unit 70 while the vehicle M is predicted to roll over. A state where the rollover of the vehicle M is predicted as possible is such a state that the vehicle M is rolling or is running along a curved course at high speed, and more particularly, where the vehicle M is in the ranges of the areas A2 and A3 shown in FIG. 3(A).

Firstly, in determining whether or not there exists a possibility that the vehicle M rolls over, since the control unit 70 determines that the possibility of rollover exists (step S101), the reversible pre-tensioner unit 50 is activated to retract the seat belt 91 (step 102).

Next, the control unit 70 detects the amount of a slack in the seat belt 91 worn by the occupant P so as to determine whether or not the slack is large (step S103). The control unit 70 determines on the amount of the slack in the seat belt 91 worn by the occupant P based on a tension value sent from, for example, a load cell which is built in the retractor 80 for detecting a tension acting on the seat belt 91. When determining that the amount of the slack in the seat belt 91 is large, the control unit 70 activates further the reversible pre-tensioner unit 50 in order to retract the seat belt 91 further (step S102).

Then, the control unit 70 determines on whether or not a rollover detection signal is being outputted from the rollover prediction and detection unit 20 (step S104), and when determining that the rollover of the vehicle M is uncertain, the control unit 70 executes the step S101 again.

Thus, when there occurs the possibility that the vehicle M rolls over from the normal state, the control unit 70 activates the reversible pre-tensioner unit 50 in the way described above and urges the occupant P to take a proper seating posture in the seat 26. The reversible pre-tensioner unit 50 applies to the seat belt 91 a tension with which the occupant P is restrained to such an extent that he or she can drive the vehicle without any constraint.

<When the Vehicle Recovers the Normal State from the State where the Vehicle is Likely to Roll Over>

When the vehicle M remains in the state where the vehicle is likely to roll over, the control unit 70 executes the steps S101, S102, S103 and S104.

When the vehicle M recovers the normal state, that is, when the state of the vehicle M shifts from the areas A2 and A3 to the area Al shown in FIG. 3(A), the control unit 70 determines that there exists no possibility that the vehicle rolls over in step S101 and executes step S105.

Since the vehicle M recovers the normal state, the control unit 70 deactivates the reversible pre-tensioner unit 50 so as to mitigate the tension which is being applied to the seat belt 91, whereby the occupant P can physically feel via the seat belt 91 that the vehicle M has recovered the normal state.

Then, the control unit 70 executes the steps S101 and S105 until a rollover prediction signal is inputted thereinto from the rollover prediction and detection unit 20.

<When the Vehicle Rolls Over from the State where the Vehicle is Likely to Roll Over>

When the state of the vehicle M shifts from the areas A2 and A3 to the area A4 in FIG. 3(A), the rollover prediction and detection unit 20 detects the rollover of the vehicle M (step S104) and outputs a rollover detection signal to the control unit 70. In addition, even in the event that the state of the vehicle M is maintained in the area A3, as shown in FIG. 3(B), when determining that the acceleration AV of the vehicle M exceeds a predetermined value L1, the rollover prediction and detection unit 20 detects the rollover of the vehicle M (step S104) and outputs a rollover detection signal to the control unit 70. When receiving the rollover detection signal so outputted thereto, the control unit 70 activates the non-reversible pre-tensioner 60 so as to restrain the occupant P in the seat 26 to thereby get the occupant P prepared for the rollover (step S106).

Thus, since the occupant restraint system 10 predicts and detects the rollover of the vehicle M based the roll angle, roll angular velocity and acceleration of the vehicle M and restrains the occupant P in the seat 26 based on the prediction and detection of the rollover, the tension on the seat 26 has already been increased so as to restrain the occupant P in the seat 26 when the vehicle M rolls over, and therefore, the safety of the occupant P can be enhanced, whereas when the risk of the vehicle M rolling over does not exist, the occupant restraint system 10 mitigates the tension on the seat 26 so as to reduce the restraining force with which the occupant P is restrained, thereby making it possible to enhance the degree of comfortableness felt by the occupant P.

In addition, while the rollover prediction and detection unit 20 is described as detecting the rollover of the vehicle M based on the roll angle, roll angular velocity and acceleration of the vehicle M, the invention is not limited thereto, and hence, the rollover of the vehicle may be predicted and detected based on the operation angle and the braking force, and moreover, the rollover of the vehicle M may be detected based on information regarding a head-on collision of the vehicle.

Figure 4:
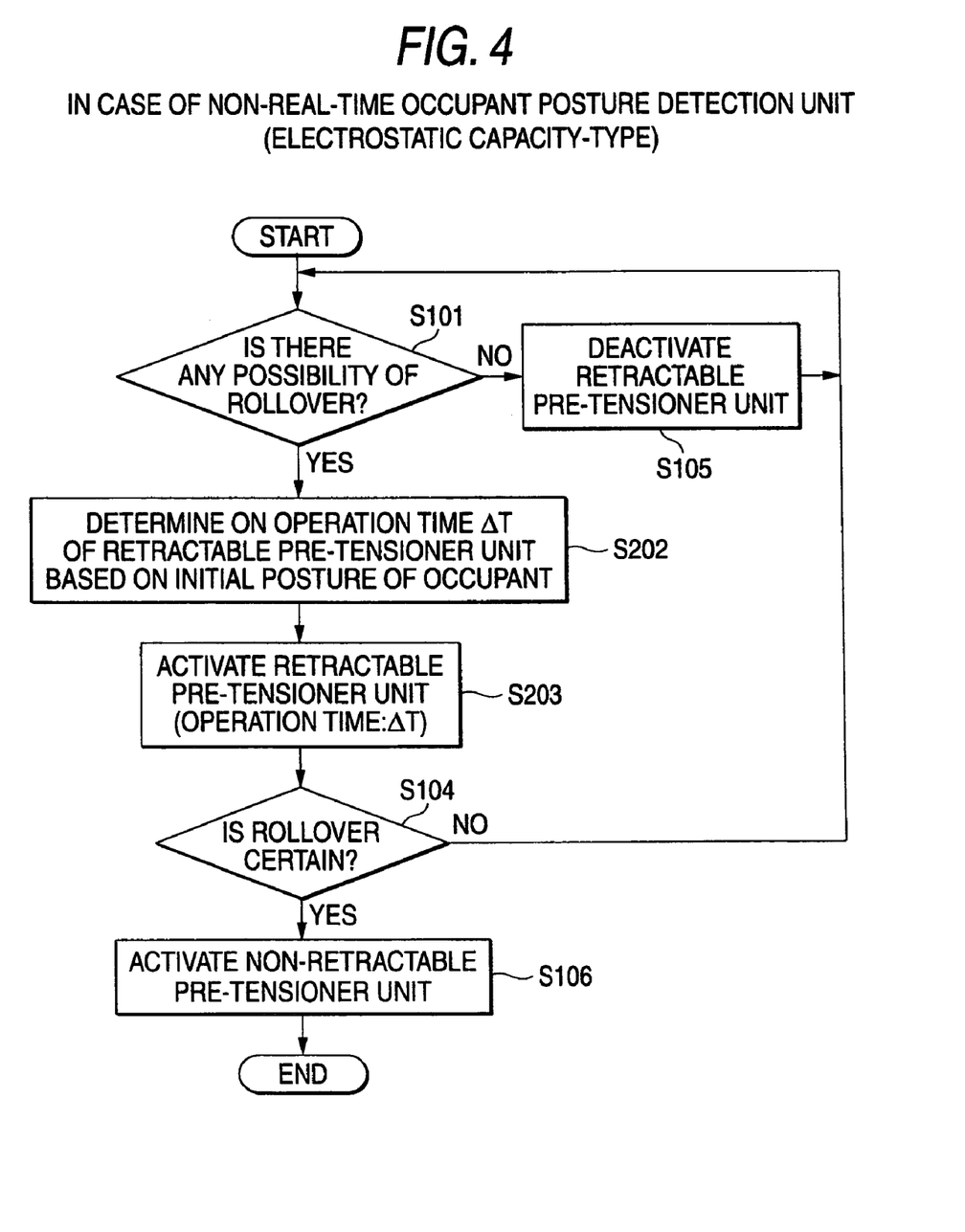
FIG. 4 is a flowchart showing another control method for the occupant restraint system shown in FIG. 1.
Figure 5:
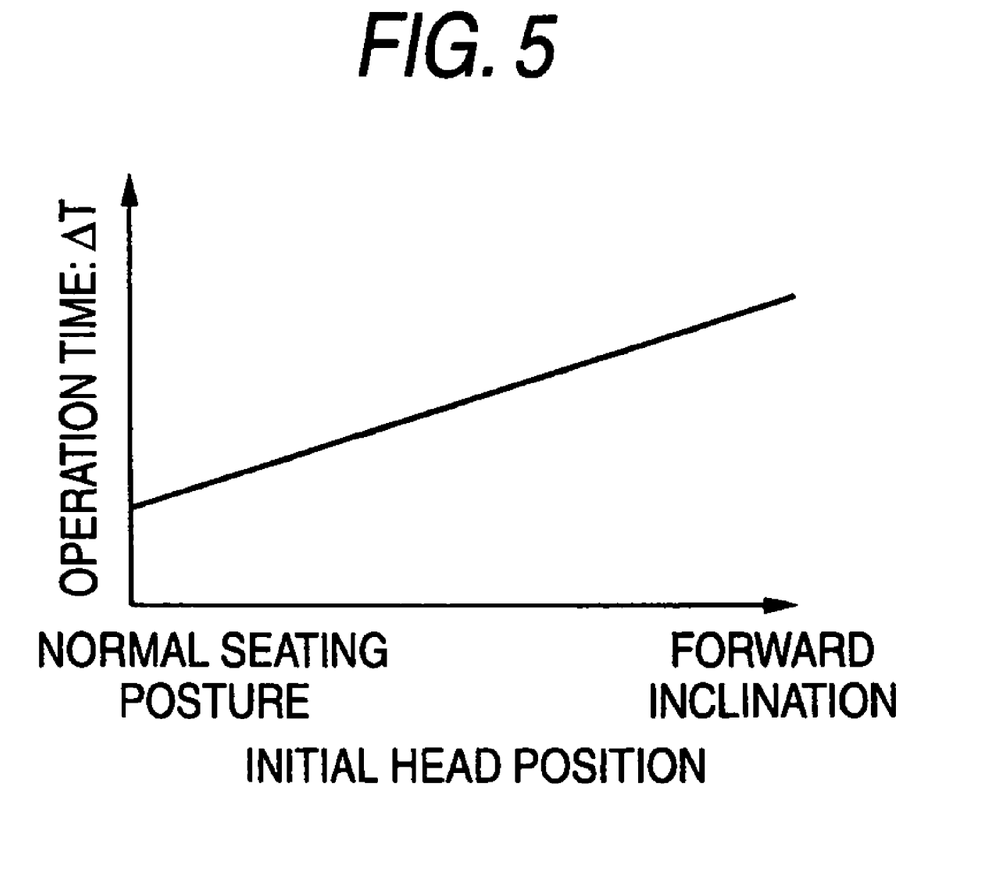
FIG. 5 is a graph showing a relationship between the posture of an occupant and a delay time of the operation timing of a secondary pre-tensioner unit in the control method shown in FIG. 4.

FIG. 4 is a flowchart showing another control method for the occupant restraint system 10 shown in FIG. 1. FIG. 5 is a graph showing a relationship between the posture of the occupant and a delay time of the operation timing of a secondary pre-tensioner unit in the control method shown in FIG. 4. An occupant posture detection unit 40 shown in FIG. 4 functions as an electrostatic capacity sensor incorporated in the position of a backrest of the seat 26 and a determination system for determining on the posture of the occupant P based on an electrostatic capacity detected by the electrostatic capacity sensor. Since the occupant posture detection unit 40 that is configured in this way can detect the posture of the occupant within a short period of time, the occupant posture detection unit 40 detects the posture of the occupant after a rollover prediction and detection unit 20 has outputted a rollover prediction signal.

In FIG. 4, like reference numerals are given to steps likened to those described in FIG. 2, and the detailed description thereof will be omitted.

<When the Vehicle is Being Driven Normally>

Since the vehicle M is being driven normally, the rollover prediction and detection unit 20 outputs a normal signal as long as the vehicle M is driven normally.

Consequently, as shown in FIG. 2, a control unit 70 executes steps S101 and S105 repeatedly. Thus, when the vehicle M is being driven normally, the control unit 70 causes the state where a reversible pre-tensioner unit 50 remains deactivated to be maintained.

<When the Vehicle is Predicted to be Likely to Roll Over from the Normal State>

The rollover prediction and detection unit 20 continues to output a rollover prediction signal to the control unit 70 while the vehicle M is predicted to roll over, that is, while the state of the vehicle M remains in the range of the area A2 in FIG. 3(A).

Firstly, in determining whether or not there exists a possibility of rollover, since the control unit 70 determines that the rollover of the vehicle is possible (step S101), an initial posture of the occupant P is detected by the occupant posture detection unit 40, and an operation time ΔT of the reversible pre-tensioner unit 50 is calculated and determined (step S202). As shown in FIG. 5, the operation time ΔT of the reversible pre-tensioner unit 50 is determined based on an initial head position of the occupant P. To be more specific, as the position of the head of the occupant P becomes farther apart from a head position in the normal seating posture thereof, the operation time ΔT of the reversible pre-tensioner unit 50 is set to be longer.

Next, the control unit 70 activates the reversible pre-tensioner unit 50 so as to keep the unit in operation by the operation time ΔT so determined (step S203), whereby the occupant P is restrained in the seat 26.

Then, the control unit 70 determines whether or not a rollover detection signal is being outputted from the rollover prediction and detection unit 20 (step S104), and when determining that the rollover of the vehicle M is uncertain, the control unit 70 executes the step S101 again.

Thus, when there occurs the possibility that the vehicle M rolls over from the normal state, the control unit 70 activates the reversible pre-tensioner unit 50 in the way described above and urges the occupant P to take the proper seating posture in the seat 26. The reversible pre-tensioner unit 50 applies to the seat belt 91 a tension with which the occupant P is restrained to such an extent that he or she can drive the vehicle without any constraint.

<When the Vehicle Recovers the Normal State from the State where the Vehicle is Likely to Roll Over>

When the vehicle M remains in the state where the vehicle is likely to roll over, the control unit 70 executes the steps S101, S202, S203 and S104.

When the vehicle M recovers the normal state, the control unit 70 determines that there exists no possibility that the vehicle rolls over in step S101 and executes step S105.

Then, the control unit 70 executes the steps S101 and S105 until a rollover prediction signal is inputted thereinto from the rollover prediction and detection unit 20.

<When the Vehicle Rolls Over from the State where the Vehicle is Likely to Roll Over>

When the rollover prediction and detection unit 20 detects the rollover of the vehicle M (step S104), the rollover prediction and detection unit 20 outputs a rollover detection signal to the control unit 70. When receiving the rollover detection signal so sent thereto, the control unit 70 activates a non-reversible pre-tensioner unit 60 so as to restrain the occupant P in the seat 26 for preparation for the rollover (step S106).

While the occupant restraint systems 10 according to the first and second embodiments of the invention each include the pair of pre-tensioner units; the reversible pre-tensioner unit 50 and the non-reversible pre-tensioner unit 60, which pair of pre-tensioner units is controlled to control the rollover of the vehicle M, according to a third embodiment of the invention, there is provided additionally another pair of pre-tensioner units which is made up of a reversible pre-tensioner unit 50 and a non-reversible pre-tensioner unit 60, and an occupant restrain system will be described below which also controls the additional pair of pre-tensioners.

Specifically speaking, a vehicle M includes a driver's seat and a front passenger's seat. An occupant restraint system includes a front passenger seat belt which can restrain another occupant who is seated in the front passenger's seat in the front passenger's seat and two pre-tensioner units for the front passenger's seat which are each adapted to apply a tension to the front passenger seat belt so as to restrain the other occupant seated in the front passenger's seat. A control unit 70 activates one of the pre-tensioner units for the front passenger's seat based on a rollover prediction signal and activates the other of the pre-tensioners for the front passenger's seat based on a rollover detection signal. The operation force of the one of the pre-tensioners for the front passenger's seat is stronger than the other of the pre-tensioners for the front passenger's seat. The operation timing of the other of the pre-tensioners for the front passenger's seat differs from the operation timing of a secondary pre-tensioner unit. For example, the one and other of the pre-tensioners for the front passenger's seat are the same reversible and non-reversible pre-tensioners as the reversible pre-tensioner unit and the non-reversible pre-tensioner unit which are described in the first embodiment, respectively.

Hereinafter, the reversible pre-tensioner unit 50 and the non-reversible pre-tensioner unit 60 which were described in the first embodiment are made to function as a reversible pre-tensioner unit 50 and a non-reversible pre-tensioner unit 60 for the driver's seat, respectively. In addition, the one and other of the pre-tensioner units for the front passenger's seat are made to function as a reversible pre-tensioner unit and a non-reversible pre-tensioner unit for the front passenger's seat, respectively.

Figure 6:
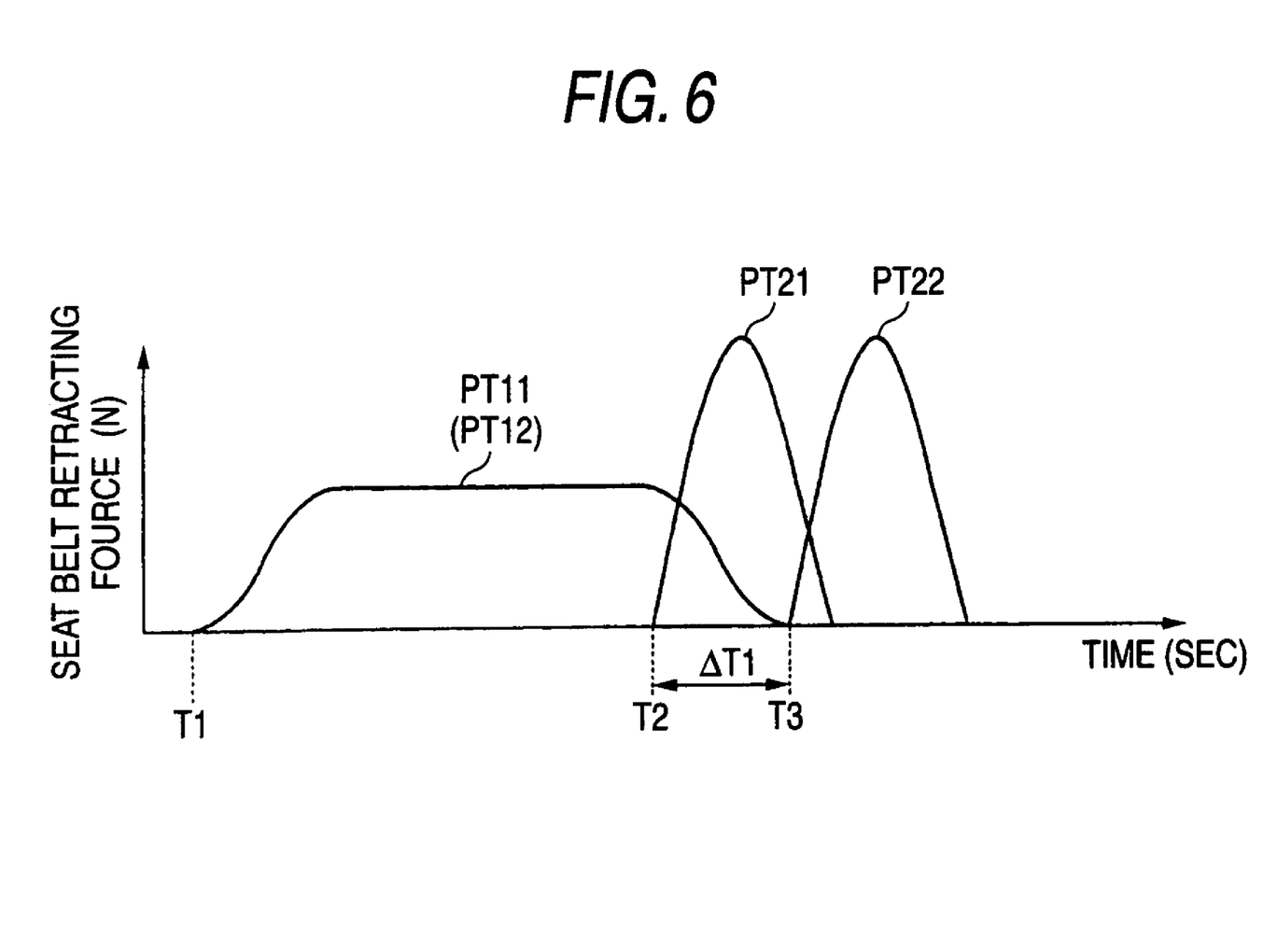
FIG. 6 is a graph showing a relationship between the operations of a reversible pre-tensioner unit and a non-reversible pre-tensioner unit and their seat belt retracting forces.

FIG. 6 is a graph showing a relationship between the operations of the reversible pre-tensioner unit and the non-reversible pre-tensioner unit and their seat belt retracting forces. In the graph shown in. FIG. 6, an axis of ordinates indicates a seat belt retracting force resulting when only the reversible pre-tensioner unit or only the non-reversible pre-tensioner unit is activated.

As shown in FIG. 6, firstly, when a rollover prediction and detection unit 20 outputs a rollover prediction signal at time T1, the control unit 70 activates the reversible pre-tensioner units PT11 and PT12 for the driver's seat and the front passenger's seat so as to apply tensions to their corresponding seat belts.

Next, when the rollover prediction and detection unit 20 detects the rollover of the vehicle M at time T2, the control unit 70 deactivates the reversible pre-tensioner unit PT11 for the driver's seat and activates the non-reversible pre-tensioner unit PT21 for the driver's seat according to the direction of the rollover, whereby the occupant seated in the driver's seat is restrained in the seat 26 so as to get prepared for the rollover of the vehicle M. In addition, since the control unit 70 only has to activate the non-reversible pre-tensioner unit for the driver's seat, the occupant seated in the driver's seat 26 can be restrained in an ensured fashion.

Next, the control unit 70 deactivates the reversible pre-tensioner unit PT12 for the front passenger's seat and activates the non-reversible pre-tensioner unit PT22 for the passenger's seat at time T3, whereby the occupant seated in the front passenger's seat can be restrained in the seat 26 so as to get prepared for the rollover of the vehicle M. In addition, since the control unit 70 has deactivated the non-reversible pre-tensioner unit for the driver's seat, the control unit 70 only has to activate the non-reversible pre-tensioner unit for the front passenger's seat. Consequently, the control unit 70 can restrain the occupant seated in the seat 26 in the seat 26 in an ensured fashion. A time spent from the detection of the rollover of the vehicle to an actual rollover thereof is longer than a time spent from the detection of the head-on collision of the vehicle to an actual head-on collision thereof Since the timing when the occupant is restrained in the seat is made to differ from the timing when the other occupant is restrained in the other seat, within a time spent from the detection of the rollover of the vehicle to an actual rollover thereof, the secondary and quaternary pre-tensioners can be activated sequentially. Due to this, the control unit can be made smaller in size than a control unit which is adapted to activate the secondary and quaternary pre-tensioners at the same time.

The occupant restraint systems 10 of the first to third embodiments that have been described heretofore can be modified as follows. For example, in place of the non-reversible pre-tensioner unit 60, a reversible pre-tensioner unit may be provided which includes a stronger motor than the reversible pre-tensioner unit 50.

While the rollover prediction and detection unit 20 is described as predicting and detecting the rollover of the vehicle based on the values detected by the sensors 21, 22, 23, 24, respectively, which are provided on the vehicle M, the rollover of the vehicle may be predicted and detected based on values detected by a sensor for a curtain-type airbag provided on the vehicle.

While in the third embodiment, the control unit 70 is designed to time differently the activation of the non-reversible pre-tensioner unit PT21 for the driver's seat and the non-reversible pre-tensioner unit PT22 for the front passenger's seat, both the non-reversible pre-tensioner units may be timed to be activated simultaneously.

Although the rollover prediction unit and the rollover detection unit are provided in one unit in the above embodiments, the rollover prediction unit and the rollover detection unit may be provided separately.

When the rollover prediction and detection unit predicts a rollover of the vehicle (for example, when the roll angle of the vehicle exceeds 20°), the control unit activates the primary pre-tensioner unit so as to apply a tension to the seat belt to thereby restrain the occupant relative to the seat, while the occupant is allowed to know that the vehicle is about to roll over by feeling a change in tension of the seat belt. Furthermore, the operation force of the primary pre-tensioner unit may be made to be such as to allow the occupant to drive the vehicle. By adopting this configuration, the occupant is allowed to drive the vehicle which is about to roll over, so as to prevent the rollover of the vehicle through maneuvering of the vehicle by the occupant. Furthermore, when there is almost no risk of the vehicle rolling over, the occupant restraint system stops the operation of the primary pre-tensioner unit so as to mitigate the tension of the seat belt to thereby reduce the restraining force with which the occupant is restrained in the seat, thereby making it possible to enhance the degree of comfortableness felt by the occupant.

When the rollover prediction and detection unit detects a rollover of the vehicle (for example, when the roll angle of the vehicle exceeds 70°), the control unit activates the secondary pre-tensioner unit so as to restrain further the occupant, who is taking a seating posture, in the seat for preparation for a rollover of the vehicle (namely, a state in which the roll angle of the vehicle reaches 180°). Due to this, since the occupant restraint system predicts and detects a rollover of the vehicle and then restrains the occupant in the seat based on the prediction and detection of the rollover, the occupant restraint system has already increased the tension of the seat belt to restrain the occupant in the seat with the increased tension when the vehicle rolls over, and therefore, the safety of the occupant can be enhanced.

From the aforementioned explanation, those skilled in the art ascertain the essential characteristics of the present invention and can make the various modifications and variations to the present invention to adapt it to various usages and conditions without departing from the spirit and scope of the claimObviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An occupant restraint system comprising:
   a seat belt configured to restrain an occupant in a seat of a vehicle;
   a rollover prediction unit configured to predict a rollover of the vehicle based on a state of the vehicle;
   a rollover detection unit configured to detect a rollover of the vehicle based on the state of the vehicle;
   primary and secondary pre-tensioner units configured to apply a tension to the seat belt so as to restrain the occupant in the seat, an operation force of the secondary pre-tensioner unit being stronger than an operation force of the primary pre-tensioner unit;
   a control unit configured to activate the primary pre-tensioner unit based on a prediction by the rollover prediction unit that a rollover occurs and activate the secondary pre-tensioner unit based on a detection by the rollover detection unit that the rollover occurs;
   another seat belt configured to restrain another occupant seated in another seat of the vehicle; and
   tertiary and quaternary pre-tensioner units configured to apply a tension to said another seat belt so as to restrain said another occupant,
   wherein said rollover prediction unit and/or said rollover detection unit comprise at least one of a steering angle sensor configured to detect an angle of a steering wheel and a brake sensor configured to detect a brake force,
   wherein the control unit is configured to activate the tertiary pre-tensioner unit based on a rollover prediction signal and activate the quaternary pre-tensioner unit based on the rollover detection signal,
   wherein an operation force of the quaternary pre-tensioner unit is stronger than an operation force of the tertiary pre-tensioner unit, and
   wherein an activation timing of the quaternary pre-tensioner unit differs from an activation timing of the secondary pre-tensioner unit.

2. An occupant restraint system as set forth in claim 1, wherein said rollover prediction unit comprises at least one of an acceleration sensor configured to detect an acceleration of the vehicle, a roll angle sensor configured to detect a roll angle of the vehicle, and a sensor for a curtain airbag.

3. An occupant restraint system as set forth in claim 1, wherein said rollover prediction unit predicts a rollover of the vehicle when a roll rate and a roll angle of the vehicle is in a predetermined second region above a predetermined first region in which a rollover of the vehicle is not predicted.

4. An occupant restraint system as set forth in claim 1, wherein said control unit is configured to detect an amount of slack in the seat belt and activate the primary pre-tensioner unit to retract the seat belt when it is determined that the detected amount of slack is larger than a predetermined amount.

5. An occupant restraint system as set forth in claim 1, wherein said rollover detection unit comprises at least one of an acceleration sensor configured to detect an acceleration of the vehicle, a roll angle sensor configured to detect a roll angle of the vehicle, and a sensor for a curtain airbag.

6. An occupant restraint system as set forth in claim 3, wherein said predetermined second region has a lower second region and an upper second region above the lower second region, and wherein said rollover detection unit detects a rollover of the vehicle when a roll rate and a roll angle of the vehicle is in the upper second region and an acceleration of the vehicle is higher than a predetermined acceleration level.

7. An occupant restraint system as set forth in claim 3, wherein said rollover detection unit detects a rollover of the vehicle when a roll rate and a roll angle of the vehicle is in a predetermined third region above the predetermined second region.

8. An occupant restraint system as set forth in claim 1, wherein said rollover prediction unit and said rollover detection unit are provided in one unit.

9. An occupant restraint system as set forth in claim 1, wherein said primary pre-tensioner unit is a reversible pre-tensioner unit.

10. An occupant restraint system as set forth in claim 1, wherein said primary pre-tensioner unit comprises a motor.

11. An occupant restraint system as set forth in claim 1, wherein said secondary pre-tensioner unit is a non-reversible pre-tensioner-unit.

12. An occupant restraint system as set forth in claim 1, wherein said secondary pre-tensioner unit comprises an explosive driver.

13. An occupant restraint system as set forth in claim 1, further comprising:
   an occupant posture detection unit configured to detect a posture of the occupant and output an occupant posture signal, wherein the control unit activates the primary pre-tensioner unit based on the rollover prediction signal and the occupant posture signal.

14. An occupant restraint system as set forth in claim 13, wherein said occupant posture detection unit is configured to detect a distance between a position of the occupant and a regular seating position and wherein the control unit is configured to activate the primary pre-tensioner unit for an operation time which increases as the distance increases.

15. An occupant restraint system as set forth in claim 13, wherein said occupant posture detection unit comprises a camera configured to capture an image of the occupant and an image recognition unit configured to determine the posture of the occupant based on the image captured by the camera.

16. An occupant restraint system as set forth in claim 13, wherein said occupant posture detection unit comprises an electrostatic capacity sensor configured to detect the posture of the occupant.

17. An occupant restraint system as set forth in claim 1, further comprising:
   a collision sensor configured to detect a collision of the vehicle, wherein the control unit activates the secondary pre-tensioner unit when the collision sensor detects a collision of the vehicle.

18. An occupant restraint system as set forth in claim 17, wherein said collision sensor comprises at least one of a side impact sensor, a frontal collision sensor and an acceleration sensor provided in a SRS unit.

19. An occupant restraint system as set forth in claim 1, wherein the secondary pre-tensioner unit and the quaternary pre-tensioner unit are activated sequentially.

20. An occupant restraint system as set forth in claim 19, wherein the quaternary pre-tensioner unit is activated after the secondary pre-tensioner unit.

21. An occupant restraint system as set forth in claim 1, wherein said secondary pre-tensioner unit comprises a motor.

22. An occupant restraint system comprising:
   seat belt means for restraining an occupant in a seat of a vehicle;
   rollover prediction means for predicting a rollover of the vehicle based on a state of the vehicle;
   rollover detection means for detecting a rollover of the vehicle based on the state of the vehicle;

primary and secondary pre-tensioner means for applying a tension to the seat belt means so as to restrain the occupant in the seat, an operation force of the secondary pre-tensioner means being stronger than an operation force of the primary pre-tensioner means; and control means for activating the primary pre-tensioner means based on a prediction by the rollover prediction means that a rollover occurs and activating the secondary pre-tensioner means based on a detection by the rollover detection means that the rollover occurs;

another seat belt means configured to restrain another occupant seated in another seat of the vehicle; and tertiary and quaternary pre-tensioner means configured to apply a tension to said another seat belt means so as to restrain said another occupant, wherein said rollover prediction means and/or said rollover detection means comprise at least one of a steering angle sensor configured to detect an angle of a steering wheel and a brake sensor configured to detect a brake force, wherein the control means is configured to activate the tertiary pre-tensioner means based on a rollover prediction signal and activate the quaternary pre-tensioner means based on the rollover detection signal, wherein an operation force of the quaternary pre-tensioner means is stronger than an operation force of the tertiary pre-tensioner means, and wherein an activation timing of the quaternary pre-tensioner means differs from an activation timing of the secondary pre-tensioner means.

23. A method for restraining occupants in a vehicle, the method comprising:

predicting a rollover of the vehicle based on a state of the vehicle;

detecting a rollover of the vehicle based on the state of the vehicle;

activating a primary pre-tensioner for applying a tension to a seat belt so as to restrain the occupant in the seat when a rollover is predicted;

activating a secondary pre-tensioner for applying a tension to the seat belt so as to restrain the occupant in the seat when a rollover is detected, an operation force of the secondary pre-tensioner being stronger than an operation force of the primary pre-tensioner;

activating a tertiary pre-tensioner for applying a tension to a another seat belt so as to restrain another occupant seated in another seat of the vehicle when the rollover is predicted;

activating a quaternary pre-tensioner for applying a tension to the another seat belt so as to restrain the another occupant in the another seat when the rollover is detected, wherein the rollover prediction and/or the rollover detection comprise at least one of detecting an angle of a steering wheel of the vehicle using a steering angle sensor and detecting a brake force of the vehicle using a brake sensor, wherein the tertiary pre-tensioner is activated based on the rollover prediction signal and the quaternary pre-tensioner is activated based on the rollover detection signal, wherein an operation force of the quaternary pre-tensioner is stronger than an operation force of the tertiary pre-tensioner, and wherein an activation timing of the quaternary pre-tensioner differs from an activation timing of the secondary pre-tensioner.

* * * * *